May 1, 1928.
W. G. JOY ET AL
1,668,370
MEASURING APPARATUS
Filed June 24, 1926
2 Sheets-Sheet 1
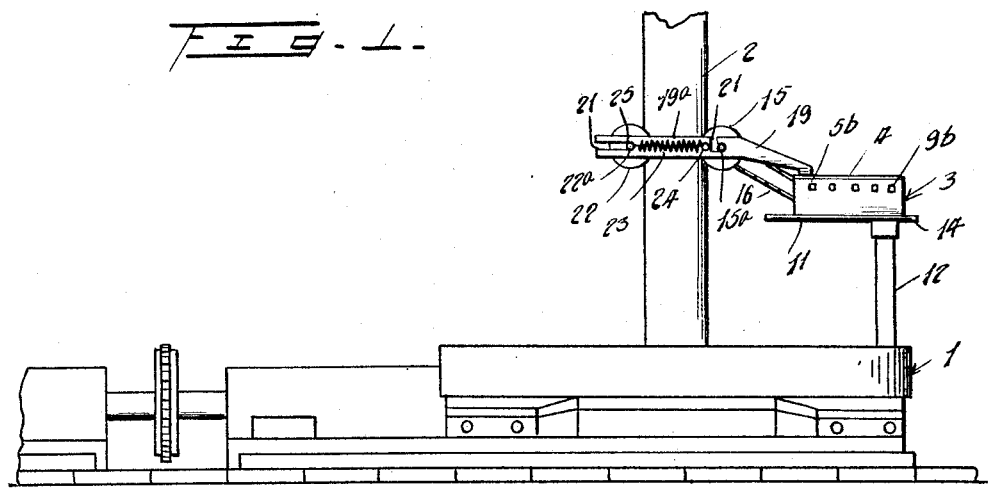
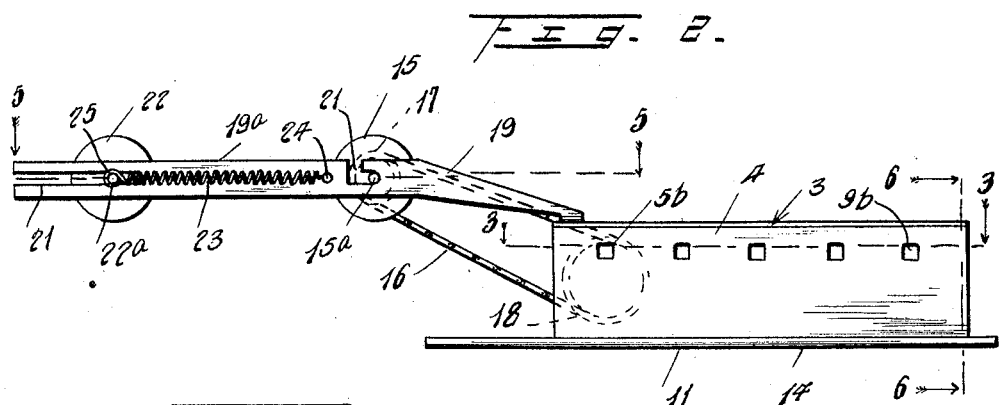
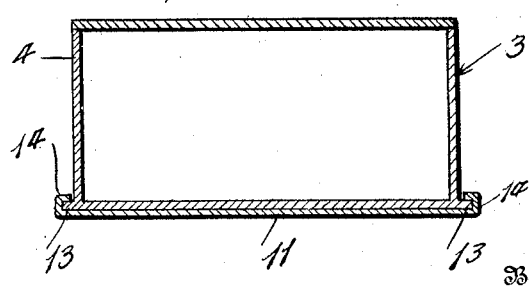
Inventor
W. G. Joy + C. H. Cherry,
By
Attorney

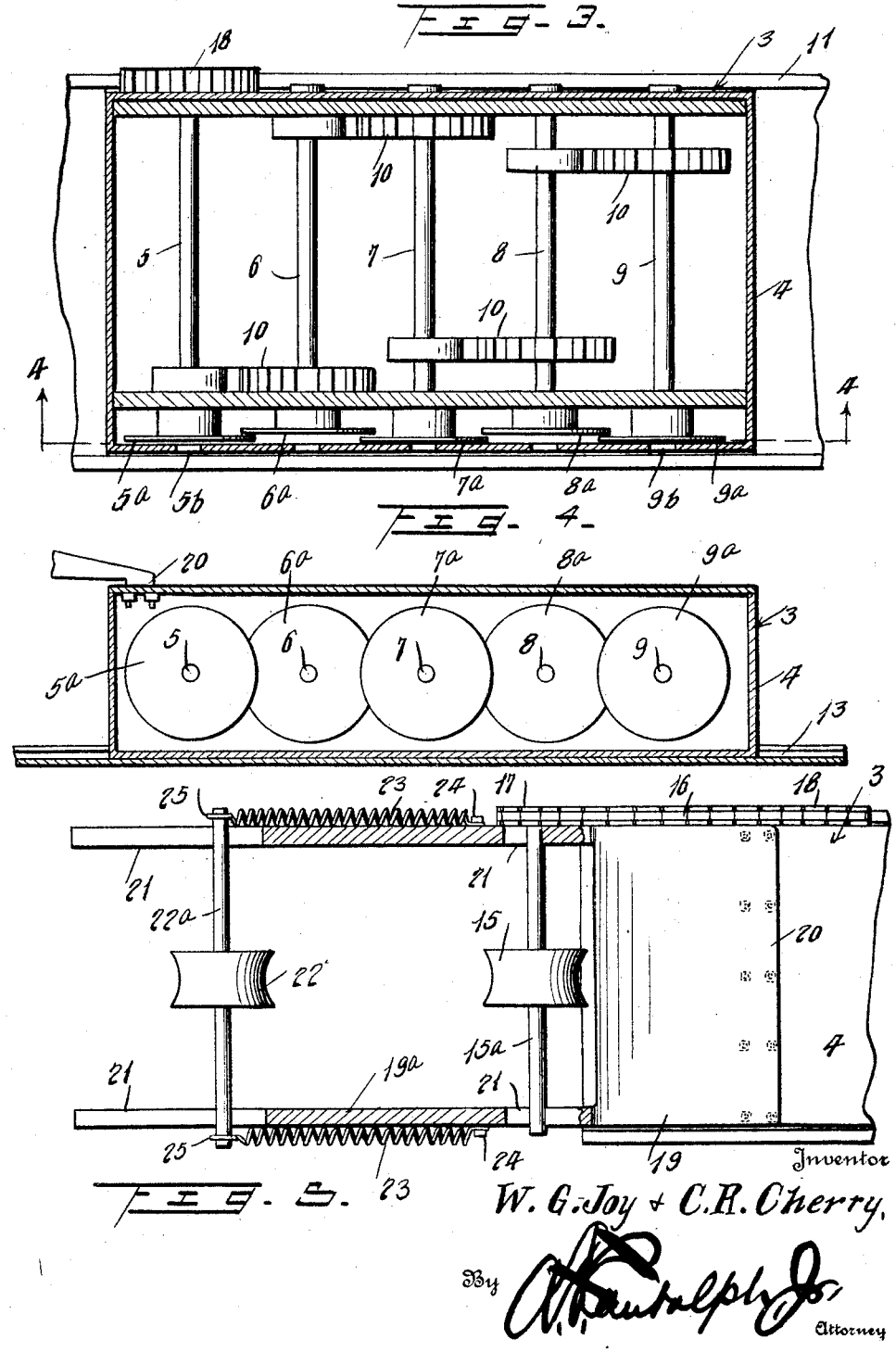

Patented May 1, 1928.

1,668,370

UNITED STATES PATENT OFFICE.

WALTER G. JOY AND CECIL R. CHERRY, OF CLEVELAND, TEXAS.

MEASURING APPARATUS.

Application filed June 24, 1926. Serial No. 118,286.

This invention relates to measuring apparatus, and has for one of its objects to provide a novel, simple and highly efficient apparatus of this character through the medium of which the length of cables, well casings and other pipes and the like, and the depth at which an oil or other well boring tool is working may be readily ascertained.

With the foregoing and the other objects in view, the nature of which will become apparent as the description proceeds, the invention consists of the construction, combination and arrangement of parts hereinafter fully described and claimed, and illustrated in the accompanying drawings, wherein:

Figure 1 is an elevational view illustrating the manner in which the apparatus is adapted to be used for indicating the length of a well pipe or casing, Figure 2 is a detail view on an enlarged scale of the measuring apparatus, Figure 3 is a horizontal sectional view taken on the plane indicated by the line 3—3 of Figure 2, Figure 4 is a vertical sectional view taken on the plane indicated by the line 4—4 of Figure 3, Figure 5 is a horizontal sectional view taken on the plane indicated by the line 5—5 of Figure 2, and Figure 6 is a vertical sectional view taken on the plane indicated by the line 6—6 of Figure 2.

Corresponding and like parts are referred to in the following description, and designated in the several views of the accompanying drawings, by similar reference characters.

In the drawings, 1 designates the rotor of a well known type of oil well drilling machines, and 2 the pipe or casing which is lowered into the well as the drilling thereof advances.

The measuring apparatus, which in the illustrated application thereof, is adapted to indicate the depth of the well at any stage of the drilling thereof and is adapted to be operated by and during the lowering of the pipe or casing 2 into the well, comprises a register 3 which in the preferred embodiment thereof consists of a casing 4, a main shaft 5, and counter-shafts 6, 7, 8 and 9. The shafts 5—9 are provided with disks $5^a$—$9^a$, respectively, which bear numbers visible through openings $5^b$—$9^b$, respectively, in the casing 4. The numerals of the disk $5^a$ register inches, those of the disk $6^a$ register feet, those of the disk $7^a$ register feet in units of tens, those of the disk $8^a$ feet in units of a hundred and those of the disk $9^a$ feet in units of a thousand. The shafts 5—9 are connected by gears 10 which are of such construction that a revolution of the disk $5^a$ will impart one-twelfth of a revolution to the disk $6^a$, and so on throughout the series of disks.

The register 3 is supported upon the rotor 1 for movement radially with respect thereto, and the supporting means therefor preferably comprises a plate or platform 11 upon which it is slidably mounted, and a post 12 by which the plate is secured to the rotor. The register 3 is provided with guides 13 which are received by grooves 14 provided on the plate or platform 11. This connection between the register 3 and plate or platform 11 prevents the former from having any lateral movement with respect to the latter.

The register 3 is operated by the pipe or casing 2 through the medium of a concave roller 15 and a sprocket chain 16 of which the latter engages a sprocket wheel 17 fixed to the former and a sprocket wheel 18 fixed to the shaft 5. The roller 15 is supported by a bracket 19 which is secured as at 20 to the register 3 and is provided with a forked portion $19^a$ embracing the pipe or casing 2. The roller 15 fits within the forked portion $19^a$ of the bracket 19, and the arms of said bracket portion are provided with bayonet slots 21 for the reception of the ends of the axle $15^a$ of the roller, said slots permitting the roller to be readily applied to or removed from the bracket. The arms of the bracket portion $19^a$ are provided with slots 21 which open out through their free ends. A concave roller 22 is also mounted within the bracket portion $19^a$, and the axle $22^a$ of this roller is journaled at its ends in the slots 21. The rollers 15 and 22 contact with the pipe or casing 2 at diametrically opposite sides thereof, and are maintained in contact with the pipe or casing by springs 23 which are secured as at 24 to the arms of the bracket portion $19^a$ and detachably connected with the ends of the roller axle $22^a$. The free ends of the springs 23 are provided with loops 25 to permit these parts to be detachably connected to the roller axle $22^a$. As the slots 21 open out through the free ends of the arms of the bracket portion 19ª, and as the springs 23 are detachably connected to the axle 22ª of the roller 22, this roller may be readily applied to or removed from the bracket 19.

From the foregoing description, taken in connection with the accompanying drawings, it should be apparent that to install the apparatus it is only necessary to remove the roller 22 from the bracket 19, secure the plate or platform 11 to the rotor 1, mount the register upon the plate or platform in a manner to position the forked portion 19ª of the bracket 19 in embracing relation with the pipe or casing 2, then apply the roller 22 to the bracket, and thereafter connect the springs 23 to the axle 22ª of this roller. As the register 3 is supported by the plate or platform 11 for radial movement with respect to the rotor 1, and as the roller 22 is supported by the bracket 19 for radial movement with respect to the rotor, this roller and the springs 23 may function to hold the roller 15 in such frictional contact with the pipe or casing 2 as to insure the positive operation of the register by and while the pipe or casing is being lowered into or raised out of the well. Furthermore, as the register 3 is supported for radial movement with respect to the rotor 1 it is impossible for the former to be injured by the lateral movement of the pipe or casing 2.

It should be understood that the drawings are merely illustrative and do not pretend to give exact proportions. Furthermore, the said drawings are illustrative of a preferred construction, it being our expectation that various changes and modifications may be made without departing from the spirit and scope of our invention.

What is claimed is:—

1. A measuring apparatus of the character set forth, comprising, in combination with a rotor, a pipe or casing passing through the rotor, a register, means supporting the register for radial movement with respect to the rotor, a roller contacting with and adapted to be rotated by the pipe or casing, means for holding the roller in contact with the pipe or casing, and means connecting the roller to the register to permit the movement of the roller to operate the register.

2. A measuring apparatus of the character set forth, comprising, in combination with a rotor and a pipe or casing passing therethrough, a register, means supporting the register for radial movement with respect to the rotor, a bracket carried by the register, a roller for operating the register and carried by the bracket and contacting with the pipe or casing, a second roller movable on the bracket radially with respect to the pipe or casing, and a spring connected to the bracket and secured to the roller.

3. A measuring apparatus comprising, in combination with first and second members of which the former is movable axially with respect to the latter, a plate provided with grooves and carried by the second member in radial relation to the first member, a register slidably mounted on the plate for movement radially with respect to the first member and provided with guides fitting in the grooves, a bracket carried by the register and provided with a forked portion embracing the first member, a roller for operating the register and journaled on the forked portion between the first member and register and contacting with the first member, a second roller rotatably and adjustably supported in the forked portion and removable therefrom and contacting with the first member at a point diametrically opposed to the point of contact between the first member and said first roller, and springs connected to the bracket and second roller and urging it in the direction of the first roller.

In testimony whereof we affix our signatures.

WALTER G. JOY.
CECIL R. CHERRY.